(12) United States Patent
Ramer

(10) Patent No.: US 10,315,126 B2
(45) Date of Patent: Jun. 11, 2019

(54) APPARATUS FOR MOLECULAR TARGETING AND SEPARATION OF FEEDSTOCK FLUIDS

(71) Applicant: Donald W. Ramer, Thornton, CO (US)

(72) Inventor: Donald W. Ramer, Thornton, CO (US)

( * ) Notice: Subject to any disclaimer, the term of this patent is extended or adjusted under 35 U.S.C. 154(b) by 984 days.

(21) Appl. No.: 14/572,598

(22) Filed: Dec. 16, 2014

(65) Prior Publication Data

US 2015/0101922 A1    Apr. 16, 2015

Related U.S. Application Data

(63) Continuation-in-part of application No. 14/213,846, filed on Mar. 14, 2014, now abandoned.

(60) Provisional application No. 61/785,784, filed on Mar. 14, 2013.

(51) Int. Cl.
*B01D 1/00* (2006.01)
*B01D 5/00* (2006.01)

(52) U.S. Cl.
CPC .......... *B01D 1/0017* (2013.01); *B01D 5/0003* (2013.01)

(58) Field of Classification Search
CPC ....... B01D 1/00; B01D 1/0017; B01D 5/0003
See application file for complete search history.

(56) References Cited

U.S. PATENT DOCUMENTS

| | | | |
|---|---|---|---|
| 3,030,592 A * | 4/1962 | Lamb | H01P 1/262 333/22 F |
| 4,540,471 A | 9/1985 | Fluchel | |
| 4,582,629 A | 4/1986 | Wolf | |
| 4,810,375 A | 3/1989 | Hudgins et al. | |
| 4,853,507 A | 8/1989 | Samardzija | |
| 4,861,955 A | 8/1989 | Shen | |
| 5,003,143 A | 3/1991 | Marks et al. | |
| 5,229,010 A | 7/1993 | Fluchel | |
| 5,308,452 A | 5/1994 | Marks et al. | |
| 5,675,909 A | 10/1997 | Pare | |
| 5,711,857 A | 1/1998 | Armstrong | |
| 5,796,080 A | 8/1998 | Jennings et al. | |
| 6,514,417 B2 | 2/2003 | Purta et al. | |
| 6,753,517 B2 | 6/2004 | Jennings | |
| 6,863,828 B2 | 3/2005 | Nagaraj et al. | |
| 6,867,401 B2 * | 3/2005 | Conway | H01J 37/32238 137/252 |
| 7,387,712 B2 | 6/2008 | Purta et al. | |
| 8,039,652 B2 | 10/2011 | Portnoff et al. | |
| 8,299,408 B2 | 10/2012 | Kimrey, Jr. | |
| 8,314,157 B2 | 11/2012 | Albinson et al. | |
| 2006/0162245 A1 | 7/2006 | Porter et al. | |
| 2008/0202982 A1 | 8/2008 | Tooley | |

(Continued)

FOREIGN PATENT DOCUMENTS

| WO | WO-2002047783 A1 | 6/2002 |
|---|---|---|
| WO | WO-2013001629 A1 | 1/2013 |
| WO | WO-2013069778 A1 | 5/2013 |

*Primary Examiner* — Renee Robinson
*Assistant Examiner* — Derek N Mueller
(74) *Attorney, Agent, or Firm* — Haynes and Boone, LLP

(57) ABSTRACT

A system for molecular targeting and separating includes a microwave energy source; a vapor source; a column configured and positioned to receive microwave energy from the microwave energy source and vapor from the vapor source; and a condenser, the condenser in communication with the column, the condenser configured to condense the vapor after the vapor receives the microwave energy.

3 Claims, 12 Drawing Sheets

(56) References Cited

U.S. PATENT DOCUMENTS

| | | |
|---|---|---|
| 2010/0089741 A1 | 4/2010 | Portnoff et al. |
| 2010/0133088 A1 | 6/2010 | Hajek et al. |
| 2010/0240929 A1 | 9/2010 | Hoong et al. |
| 2011/0118508 A1 | 5/2011 | Soi et al. |
| 2012/0175364 A1* | 7/2012 | Kimrey, Jr. ............ H05B 6/707 219/742 |
| 2012/0269678 A1 | 10/2012 | Marks et al. |
| 2013/0015144 A1 | 1/2013 | Boulware et al. |
| 2013/0041041 A1 | 2/2013 | Chandrasekhar |
| 2013/0240345 A1 | 9/2013 | Lautenschlaeger |

* cited by examiner

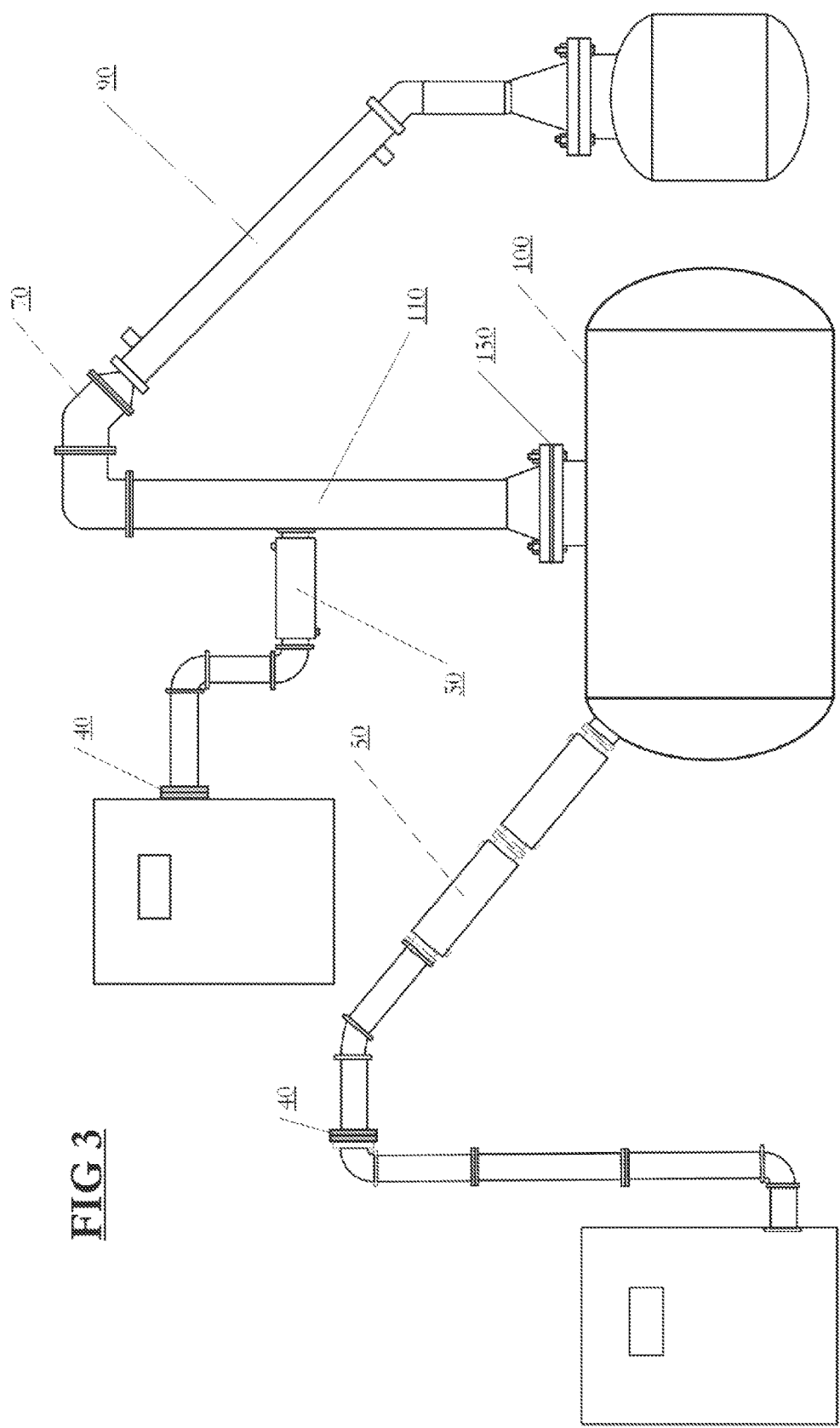

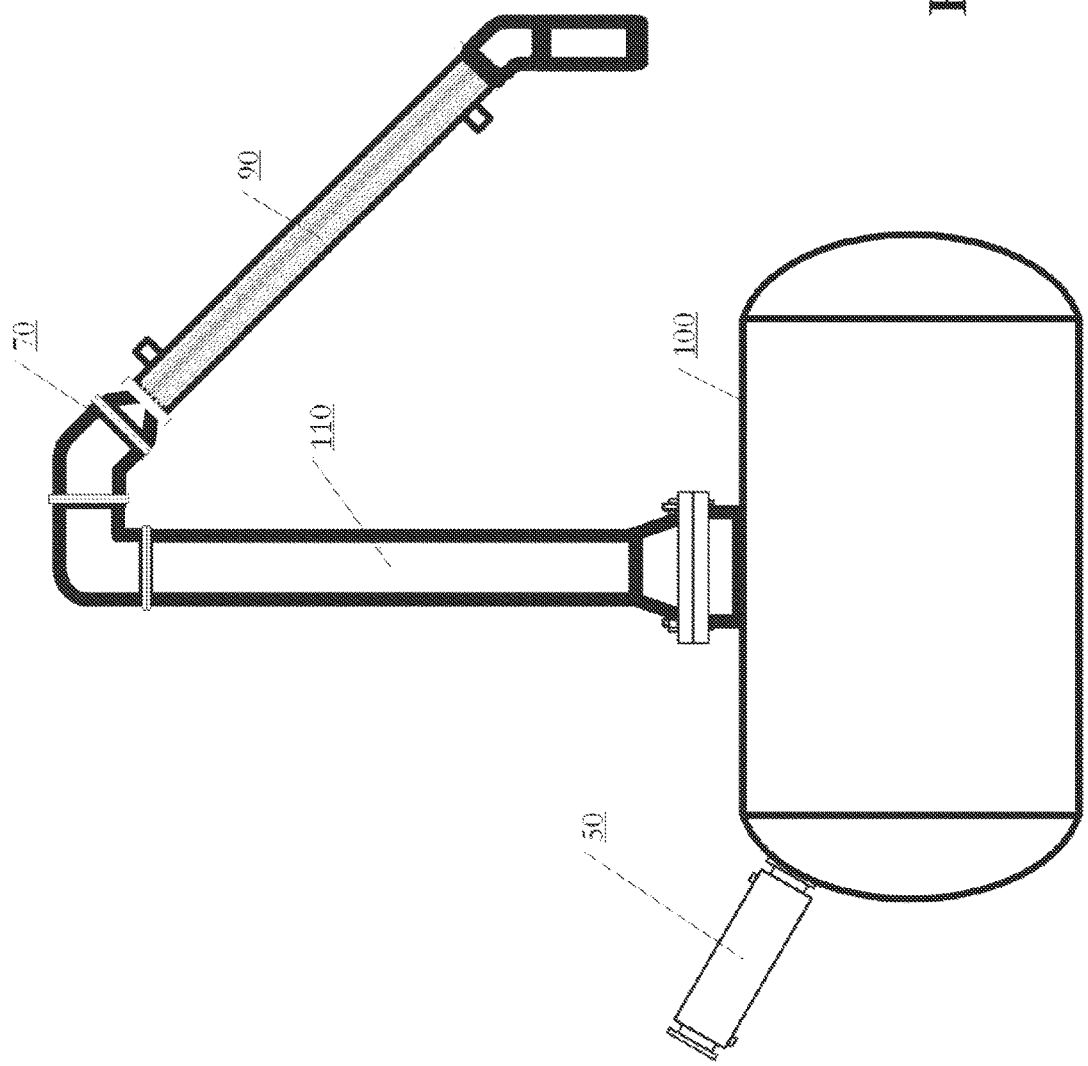

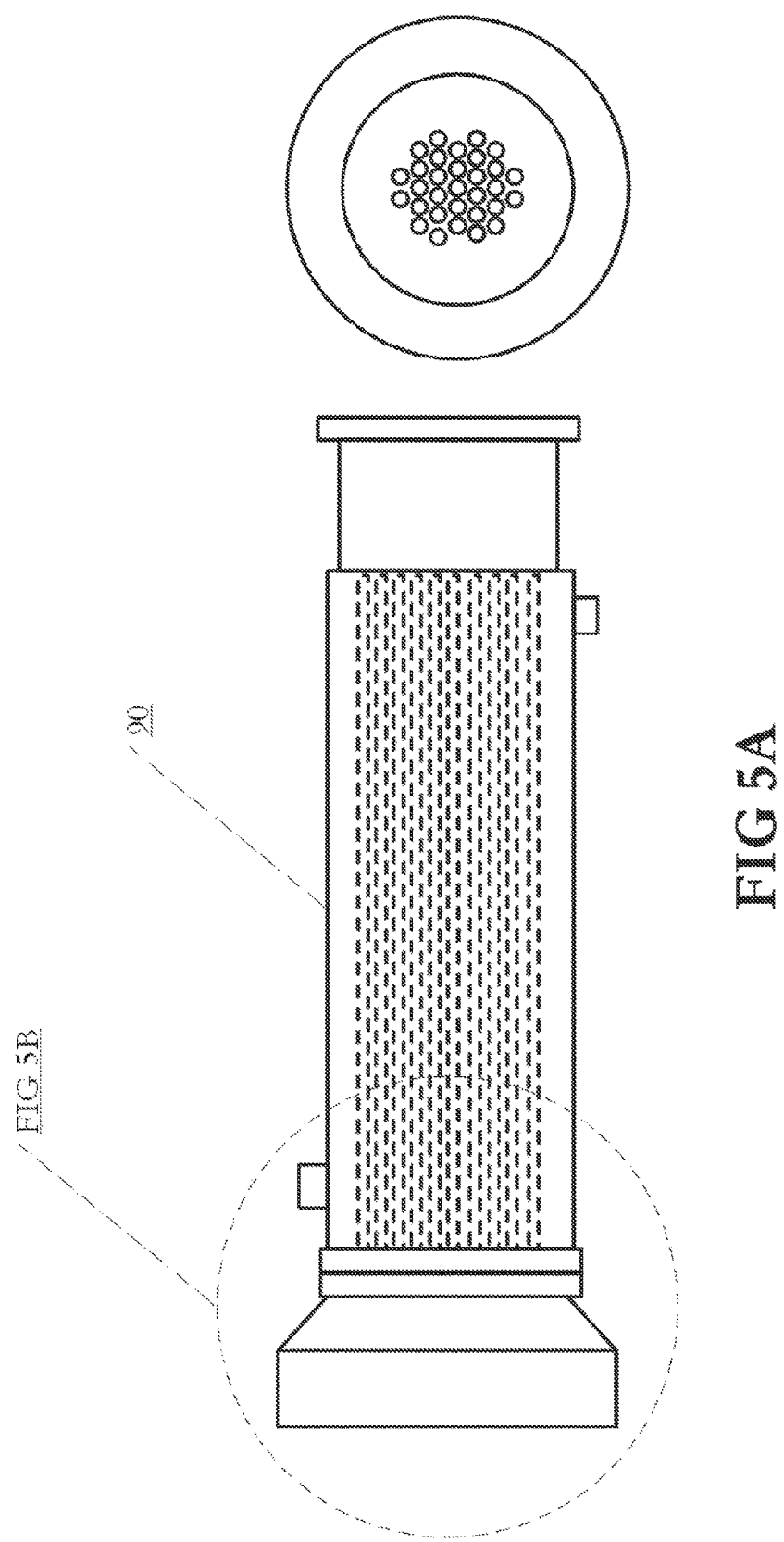

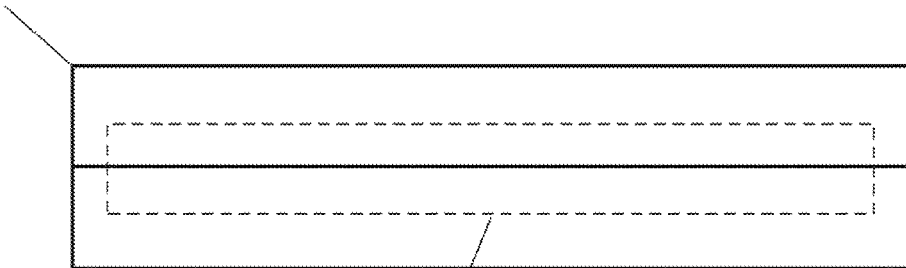
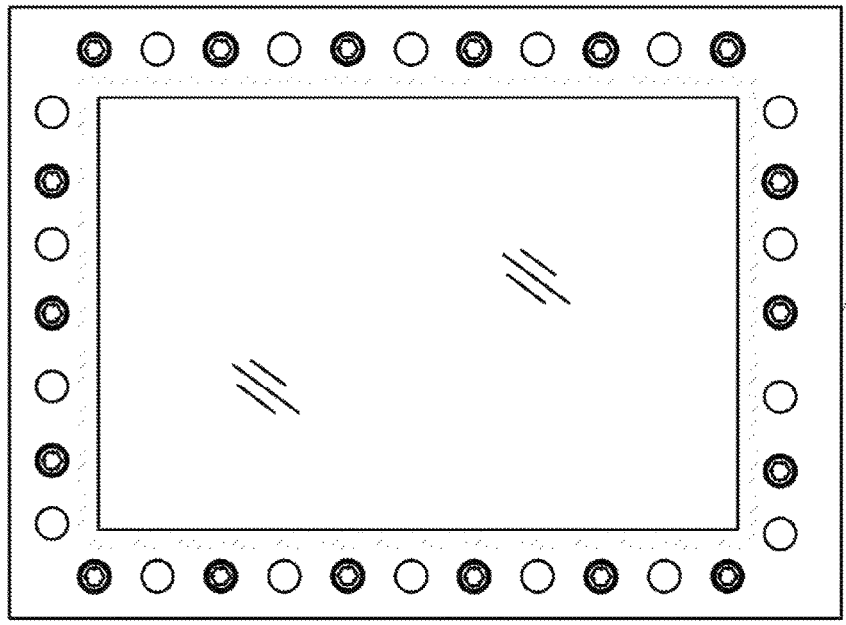
FIG 6A

Section B-B

Section C-C

APPARATUS FOR MOLECULAR TARGETING AND SEPARATION OF FEEDSTOCK FLUIDS

CROSS-REFERENCE TO RELATED APPLICATION

This application is a continuation-in-part of U.S. patent application Ser. No. 14/213,846 filed Mar. 14, 2014, which claims the benefit of U.S. Provisional Patent Application No. 61/785,784 filed Mar. 14, 2013, titled "Method And Apparatus For Molecular Targeting And Separation Of Feedstock Fluids," both of which are incorporated by reference herein in their entirety.

FIELD

The systems, apparatuses, and methods described herein relate to systems for separating and purifying constituents.

BACKGROUND

The separation of mixtures into individual constituents is necessary for a number of industrial processes. For example, a number of solvents, such as mineral spirits, chlorinated solvents, alcohols, glycols, petroleum-based or synthetic waste oils, or paint-related waste can become unsuitable for their original purpose due to accumulation of impurities or loss of original properties. What is needed is a separation system to promote the beneficial recycling and reuse of spent solvents and the proper handling and treatment of a broad spectrum of known or unknown mixtures. There exist a number of separation methods that attempt to meet industrial and environmental standards; however, these methods suffer from a number of disadvantages.

One of the most common methods used for separating fluid mixtures is conventional distillation, which generally involves the separation of mixtures based on differences in the boiling points of the constituents; however, these methods suffer from numerous disadvantages. For conventional distillation methods, there is little or no ability for an operator to target the constituent of the mixture to enrich as product. In general, the constituent of the mixture that is enriched as product using conventional distillation methods is naturally predetermined to be the constituent having a lower boiling point; thus, conventional distillation is not a reasonable separation method to employ when it is desired to enrich the constituent of the mixture having a higher boiling point as distillate product.

Additionally, there exist a number of industrially significant azeotropic mixtures, which typically cannot be separated by conventional distillation methods without the inclusion of an additional constituent to help facilitate separation. Typically, this is performed by adding an additional azeotrope. However, the addition of an azeotrope presents unnecessary complexity to separation of the original mixture into its individual constituents because the azeotrope must then be separated from the mixture.

There are a number of other types of constituent mixtures in which conventional distillation methods are not reasonable methods for separation. Examples include: 1) mixtures of constituents in which the constituents have similar boiling points, and 2) mixtures of constituents in which at least one of the constituents, at elevated temperatures, degrades or irreversibly changes its own molecular structure or the molecular structure of another constituent in an undesirable manner.

SUMMARY

Embodiments of Systems, Apparatuses, And Methods For Molecular Targeting And Separation Of Feedstock Fluids include the use of dielectric heating by irradiation with microwave energy of at least one constituent in the mixture or a catalytic agent. During operation of embodiments of the apparatus, microwave energy is directed via a waveguide from a microwave energy source to a reactor assembly causing a constituent mixture to undergo separation and emit vapors that undergo further separation as they ascend a column and are directed to a condenser assembly and a collection tank. Separation of a wide variety of mixtures into individual constituents having high purity levels is made possible by adjusting system parameters to provide the desired output. The disclosed apparatus enables an operator to target the desired constituents in a mixture to be purified and collected as product. Embodiments of a method for separation include the process of "tuning" the targeting and separation assembly. The parameters used to "tune" the assembly include microwave energy, waveguide and condenser cooling, flow rate, and vacuum. Because microwave energy is allowed to propagate up the column, based on input energy from the microwave, the molecules can be targeted for continual bombardment to achieve a greater degree of separation than standard separation methods that only use the heat as a way to release molecules from the fluid in the reactor. Additionally in some configurations, the other variables in the system may be changed to act on the vapors ascending the column and require them either to remain in the reactor or ascend at a higher rate, and have either less or more contact with the energy propagating within the column. When the temperature of the cooling is changed, this will affect the molecules' ability to ascend up the column and translate the bend at the top of the column and enter the condenser assembly. When flow rate and vacuum are changed, this allows for the molecules in the fluid to have more or less contact with the microwave energy and affect the release rate of the molecules trapped within the fluid. The addition of another source of microwave radiation to the column would allow the molecules to receive more radiation and further separate them into purer and purer elements. This creates what is termed a "washing machine like effect" or "washing machine effect" herein, where parts of a mixture are agitated in the reaction vessel until parts are separated and exited through the column.

Embodiments of the disclosed separation method herein can be applied to a number of reaction mixtures and reactor types, such as batch reactors, continuously stirred tank reactors, or plug flow reactors to enhance the yields and purity of reaction products. The apparatus can operate under vacuum, at ambient pressure, or at greater than ambient pressure. For many mixtures, separation may be further enhanced and made safer to the operator by way of one or more embodiments described herein.

In an embodiment, the apparatus is equipped with a microwave choke located between the column and condenser assembly for enhancing separation for numerous mixtures.

In an embodiment, the reactor assembly is equipped with a heat exchanger to increase versatility in the ability to select constituents to separate and to increase the purity of the product resulting from the process. The heat exchanger can take the form of a standard heat exchanger or one that is constructed of silicon carbide, or with silicon carbide elements, that can either be heated with standard methods, or another source of microwave energy.

In an embodiment, the reactor assembly is equipped with a fluid circulation assembly that circulates the mixture in a controlled manner to allow for greater versatility in the ability to select constituents to separate and to increase the purity of the product resulting from the process. The fluid mixture can also be cooled to manage a better separation of some mixtures that are sensitive to high heating methods of separation.

In an embodiment, the reactor assembly or its contents further comprise a supplemental microwave absorbing material, suspended or dissolved, that increases in temperature upon being irradiated with microwave energy. This material has been contemplated to enhance the ability for the disclosed apparatus to separate some types of mixtures, and also facilitates separation of constituent mixtures not containing a constituent that undergoes dielectric heating upon being irradiated with microwave energy. Many materials may be used for the catalytic benefit to the heating process. One material that has been utilized is silicon carbide. This material can be irradiated by the microwave and reach possible temperatures of 3000° F. In one embodiment, there can be suspended silicon carbide rods for the fluid to either flow around or through to get the benefit of the high heat availability.

In an embodiment, the waveguide window has been modified, or treated, to improve overall performance of the apparatus and to address safety issues when operating the device for some types of mixtures. The modified window is advantageous for limiting the backflow of gasses and contaminants to protect the microwave transmitter and the waveguides. It is also contemplated that the window and the frame can be located in many locations. There can also be multiple windows used to protect the equipment. Embodiments of the systems described are designed to protect the microwave transmitter from gasses propagating up the waveguides and possibly getting back to the transmitter itself. Many other combinations of windows, frames, and wave guide components are possible within the principles of operation of the system. There are many materials that are advantageous for the construction of the window and the frame. Some of these can be ceramics or even highly thermally conductive materials. The window can also be part of the construction of the waveguides themselves.

In an embodiment, the window assembly comprises a window frame of aluminum and a treated insert of PTFE secured within.

In an embodiment, the window assembly comprises a window frame of ceramic material and a treated insert of ceramic material secured within.

In an embodiment, the window assembly comprises a window frame of ceramic material and a treated insert of PTFE secured within.

In an embodiment, the apparatus comprises a window frame and a treated insert secured within, including a gasket material for vacuum usage.

In an embodiment, the apparatus comprises a window frame and a treated insert secured within, where no gasket material is used.

A system for molecular targeting and separating includes a microwave energy source; a vapor source; a column configured and positioned to receive microwave energy from the microwave energy source and vapor from the vapor source; and a condenser, the condenser in communication with the column, the condenser configured to condense the vapor after the vapor receives the microwave energy. Optionally, the vapor source includes a reactor, the reactor including a constituent mixture, the reactor receiving the microwave energy from the microwave energy source and producing vapor. Alternatively, the system further includes a waveguide, the waveguide interconnected with the reactor and the microwave source, the waveguide positioned and configured to conduct the microwave energy to the reactor. Alternatively, the waveguide includes a cooled waveguide section, the cooled waveguide section positioned between the microwave source and the reactor, wherein the cooled waveguide section is configured to prevent a backflow of vapor towards the microwave source and increase a residence time of the vapor. Optionally, the system further includes a bend portion located between the column and the condenser, the bend portion configured, in combination with a temperature control of the condenser, to slow the vapor from reaching the condenser and increasing the residence time of the vapor.

In one embodiment, an apparatus for molecular targeting and separating of mixtures includes a microwave energy source capable of transmitting microwave energy. The apparatus further includes a reactor assembly. A constituent mixture including separable constituents is stored in the reactor assembly and undergoes irradiation and separation to emit vapors. The apparatus further includes a waveguide wherein microwave energy is conducted and directed from the microwave energy source to the reactor assembly. The apparatus further includes a column in fluid communication with the reactor assembly wherein the column is configured and attached to the reactor assembly to allow microwave energy to propagate and the vapors to be conducted there through. The apparatus further includes a condenser assembly configured to provide for variably cooling the vapors and a collection tank in communication with the condenser assembly and configured to cool the vapors and collect the vapors. Optionally, the waveguide comprises a waveguide section; a cooled waveguide section; and a waveguide window. Alternatively, the reactor assembly further comprises a supplemental microwave absorbing material coated around the reactor assembly. In one alternative, the apparatus further includes a supplemental microwave absorbing material in the constituent mixture. Optionally, the waveguide further comprises a rectangular cross-section form. Alternatively, the waveguide further comprises an elliptical cross section form. Optionally, the apparatus further comprises a microwave choke. In another alternative, the microwave energy transmitted by the microwave energy source is within an approximate frequency range of at or between 300 megahertz and 300 gigahertz. In yet another alternative, the condenser assembly comprises a double tube heat exchanger. Optionally, the condenser assembly comprises a shell and tube heat exchanger. Alternatively, the condenser assembly utilizes water as a cooling fluid. Optionally, the condenser assembly utilizes a mixture of water and glycol as a cooling fluid. In one configuration, the collection tank is equipped externally to and in fluid communication with an external storage tank and a fluid pump capable of transferring product to the storage tank. Optionally, the apparatus further includes a programmable logic controller. Alternatively, the reactor assembly comprises a batch reactor. Optionally, the reactor assembly comprises a continuously stirred tank reactor. Optionally, the reactor assembly further comprises a heat exchanger. Alternatively, the heat exchanger comprises a double tube heat exchanger. Optionally, the heat exchanger comprises a hollow coil submerged in a thermal bath wherein a fluid is circulated through the coil. In another configuration, the heat exchanger comprises a tank comprising a cooling fluid in which the reactor assembly is submerged. Optionally, the heat exchanger comprises one or more shell and tube heat exchangers. Alternatively, comprising a fluid circulating assembly. Optionally, the reactor assembly comprises a valve for assisting the insertion of the constituent mixture or an external atmosphere into the reactor assembly. In another alternative, the apparatus includes a grounding gasket in electrical communication with an electrical ground. Optionally, the grounding gasket is constructed from a copper alloy. Alternatively, the waveguide window is constructed from a material substantially transparent to microwave energy. In one configuration, the waveguide window is constructed from a material comprising polytetrafluoroethylene. In another configuration, the waveguide window is constructed from a material comprising a ceramic material. Optionally, the cooled waveguide section further comprises a shell and tube type heat exchanger. Alternatively, the cooled waveguide section further comprises water as a cooling fluid. Optionally, the cooled waveguide section further comprises a mixture of a glycol and water as a cooling fluid.

In one embodiment, a method for separating mixtures using a molecular targeting and separation apparatus includes inserting a constituent mixture comprising separable constituents into a reactor assembly. The method further includes directing microwave energy via a waveguide from a microwave energy source wherein the reactor assembly and the microwave energy causes the constituent mixture to emit vapors that ascend a column. The method further includes containing or releasing the vapors within the column by adjusting system parameters. The method further includes, selectively cooling the vapors within a condenser assembly to produce a product and collecting the product in a collection tank. Alternatively, the method further includes transferring the product from the collection tank to an external tank. In one alternative, the method further includes applying vacuum to the reactor assembly. Optionally, the method includes adding an accelerating constituent to the constituent mixture. In one configuration, the accelerating constituent comprises silicon carbide. In another configuration, the method includes adjusting microwave energy output power toward the mixture via a programmable logic controller. Alternatively, the method includes selectively transferring thermal energy to or from the constituent mixture via a heat exchanger. Optionally, the method includes circulating the constituent mixture to and from the reactor assembly via a fluid circulation assembly. In one alternative, the method includes adjusting circulation provided by a pump system. Optionally, the constituent mixture comprises a lower boiling point liquid and a higher boiling point liquid. Alternatively, the constituent mixture comprises an azeotropic mixture. In one alternative, the selectively cooling includes slowing the exit of the vapors from the column by adjusting a temperature of the condenser so the vapors more slowly traverse a bend between the column and the condenser.

In one embodiment, a system for molecular targeting and separation of mixtures includes a microwave energy source capable of transmitting microwave energy to a reactor assembly, the reactor assembly configured to receive a constituent mixture comprising separable constituents. The system further includes a waveguide capable of directing the microwave energy to the reactor assembly. The system further includes a column in fluid communication with the reactor assembly. The system further includes a condenser assembly in fluid communication with the column and a collection tank. Optionally, the waveguide comprises a waveguide section, a cooled waveguide section, a waveguide window, and one or more flanges to secure said waveguide window between said waveguide section and said cooled waveguide section. Alternatively, the system further includes a microwave choke, the microwave choke located at the end of the column. Optionally, the system includes a vacuum pump, the vacuum pump in communication with the reactor assembly, the vacuum pump configured to apply a vacuum force to the reactor assembly. Alternatively, the system includes a grounding gasket, the grounding gasket providing an electrical ground. Optionally, the system includes a programmable logic controller, the programmable logic controller configured to control the microwave energy source, a first temperature of the waveguide, and a second temperature of the condenser. In one configuration, the system includes a heat exchanger, the heat exchanger interconnected with the reactor assembly and configured to heat and cool the constituent mixture. Optionally, the system includes heating elements or a catalytic material in the constituent mixture. In one alternative, multiple parameters, including a power output of the microwave energy source, a first temperature of the waveguide, and a second temperature of the condenser are adjusted to contain and release vapors from within said column and said reactor assembly.

Embodiments of the systems disclosed may also include a liquid cooled waveguide for limiting the backflow of gasses and contaminants to protect the microwave transmitter and allow for more precise tuning and targeting of the separation system, if needed. It is also contemplated that the liquid cooled waveguide sections can be located in many locations. It is also contemplated that there can be multiple liquid cooled waveguide segments used to protect the equipment or facilitate separation. The liquid cooled waveguide is designed to protect the microwave transmitter from gasses propagating up the waveguides and possibly getting back to the transmitter itself. The liquid cooled waveguide sections allow the system to be safer for the operator and more efficient, because the segments allow the operator to "tune" the system for safety and purity of any feedstocks or fluids that are being heated. Many other combinations of liquid cooled wave guide segments and non-liquid cooled waveguide segments can be contemplated and still fall under the scope of this disclosure.

In an embodiment, the apparatus is further equipped with a grounding gasket to address safety issues when operating the device for some types of mixtures.

The term "constituent" is used herein to denote a material, chemical compound, or substance.

The term "component" is used herein to denote a part, or piece, of apparatus.

The term "feedstock" is used herein to denote a mixture of constituents that is inserted into the reactor assembly prior to or during the course of operation. Feedstock may be known or unknown in composition, liquid or vapor, and may further comprise a solid, dissolved or suspended.

The term "operator" is used herein to denote a person that operates the apparatus.

The term "product" is used herein to denote the material separated from the constituent mixture that has passed through the column and condenser sections of the apparatus and is collected.

The term "vapor" is used herein to denote a constituent or group of constituents in a gaseous or vapor phase after the constituent mixture has been exposed to a microwave energy source.

BRIEF DESCRIPTION OF THE DRAWINGS

FIG. 3 is a side view of an embodiment of a molecular targeting and separation system further equipped with a secondary source of microwave radiation;

FIG. 4 is a cross-section of an embodiment of a molecular targeting and separation system;

FIG. 5A is a detail of an embodiment of a condenser that may be used with a molecular targeting and separation system;

FIG. 6A is a view of an embodiment of a window used within a molecular targeting and separation system;

Figure 1:
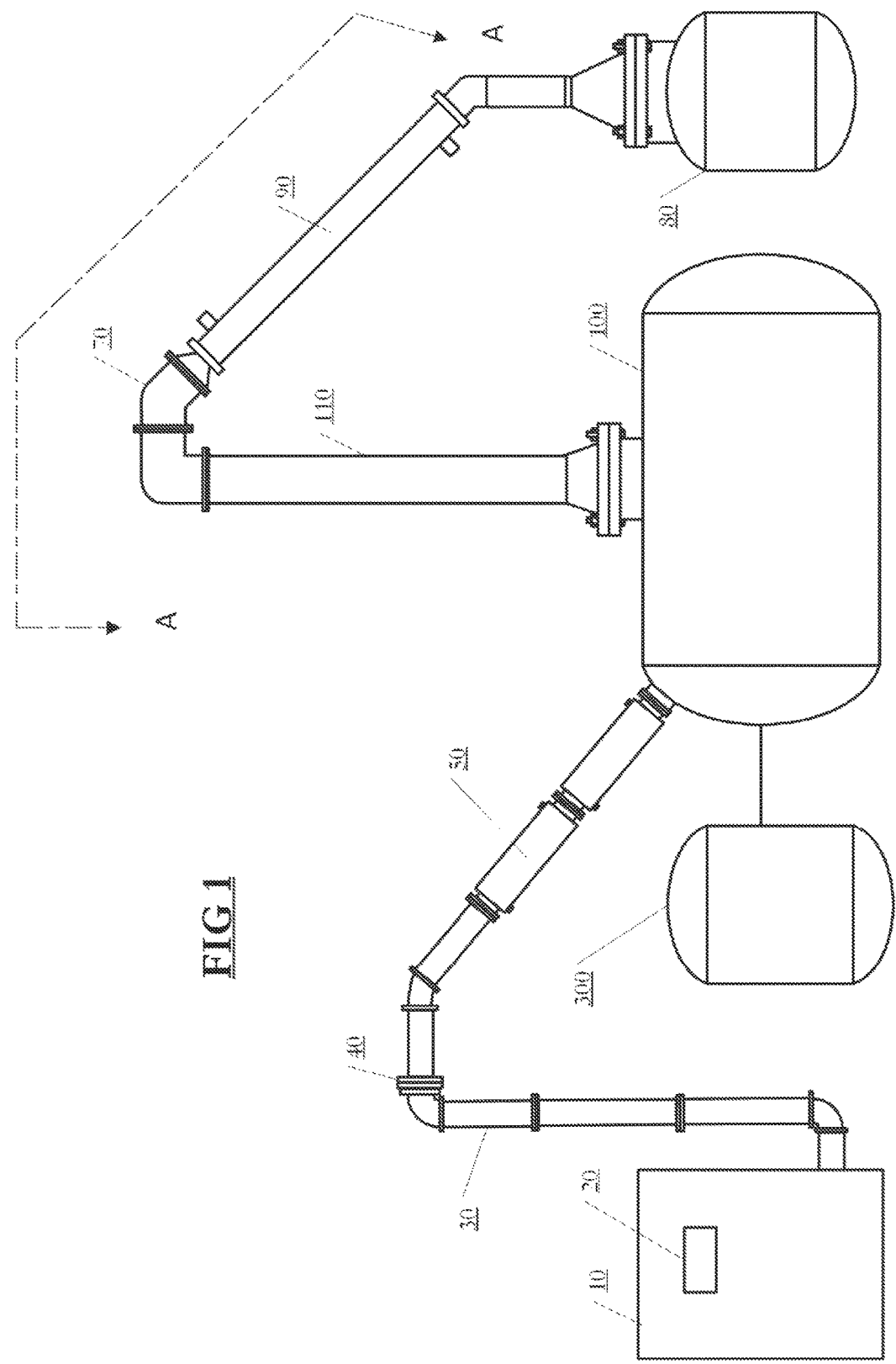
FIG. 1 is a side view of an embodiment of a molecular targeting and separation system.

Before explaining the disclosed embodiments of the disclosed device in detail, it is to be understood that the device is not limited in its application to the details of the particular arrangements shown, since the device is capable of other embodiments. Also, the terminology used herein is for the purpose of description and not of limitation.

DETAILED DESCRIPTION OF THE DISCLOSED EMBODIMENTS

The following description is provided to enable any person skilled in the art to make and use the disclosed apparatus and method. Various modifications, however, will be known to those skilled in the art in light of this disclosure, since the generic principles of the systems, apparatuses, and methods have been defined herein specifically to provide for systems, apparatuses, and methods for separating a wide variety of mixtures into individual constituents, by exposing the constituent mixture to microwave energy, and adjusting various parameters of the apparatus until the desired product is obtained.

It is generally established that microwave energy is well-suited for affecting polar molecules (e.g., alcohols, water and glycols). In general terms, polar molecules have a partial positive charge at one end and a partial negative charge at another end, and the molecules rotate as they align themselves with the alternating electric field of the microwave energy. Generally, material that is more polar will be affected more than a material that is less polar or nonpolar. Thus, microwave energy has varying effects on the constituents in a mixture to different extents based on their polarity or lack thereof. In this way, two materials having a similar boiling or vaporization point can be targeted selectively based on their varying level of polarity. Even if two materials have a similar boiling point, they are unlikely to have the same polarity, allowing them to be affected differently by microwave energy as they ascend the column and, therefore, separate. It is theorized that in the column, the materials most affected by microwaves become more greatly excited and ascend the column faster and, therefore, separate from other materials.

Microwave energy in the present disclosure is used to subject the constituents in a fluid mixture to rapid rotational activation, which, when complimented with proper adjustment of system parameters, causes the constituents to separate from each other until the process results in a product highly enriched with the desired material. For a wide variety of mixtures, the disclosed systems, apparatuses, and methods present numerous benefits, including higher product purity, lower energy consumption, as well as acceleration of reaction rates, and higher reaction yields for reactive mixtures. Additionally, the disclosed device enables an operator to select which constituent to enrich and collect as product, regardless of the respective boiling point of each constituent When separating constituents with similar boiling points, there needs to be a way to target which element within the mixture is separated first. In an embodiment of the disclosed systems, apparatuses, and methods, the separation of mixtures with constituents that have the same boiling point is done by first deciding which constituents are present within the mixture. In most cases the mixtures have one element or constituent that is desirable to extract and retain as product. In the case where there is more than one element in the mixture that it is desirable to separate as product, the parameters in the system can be manipulated to target the desired elements. This targeting is done by lowering the temperature of the liquid being circulated within the reaction vessel and enabling the elements to be separated by the microwave radiation exclusively and not by the thermal effect of the microwave radiation. By precisely controlling the temperature, the specific element can be targeted and removed before another element. The process can also be further facilitated when the mixture has constituents that have close boiling points and different dielectric properties. The dielectric property will accelerate the process of separation even under cooled conditions. This is because the constituent with the higher dielectric affinity will receive a more robust reaction to the microwave energy. When a feedstock has a larger percentage of one element, it is advantageous to remove the constituent that has the highest value and only get the most profitable element removed, or enriched within the system. Some feedstocks can even contain many types of the same elements. In the case of Automotive Antifreeze, the feedstock can include Ethylene Glycol, Propylene Glycol and even some oils and water. As it is well known that oils have a very high boiling point, well over 600 degrees Fahrenheit, the Glycol products have very similar boiling points. Their boiling point for Ethylene Glycol is 387.1 degrees Fahrenheit. The boiling point for Propylene Glycol is 370.8 degrees Fahrenheit. This is a difference of only 16.3 degrees. Each of these constituents in the mixture, Ethylene Glycol and Propylene Glycol, has the same dielectric properties and close boiling points. In order to allow for the separation of these elements into their individual parts, the temperature control of the circulated liquid is critical.

Embodiments of the disclosed systems include some key components that allow the systems to operate safely and allow for the operator, or the programmable logic controller (PLC), to tune the systems while in operation. The construction of the disclosed apparatus includes some measurements and assemblies to allow for the operation as disclosed. Some of these are the length and construction of the column, the treatment and location of the window, the usage of water cooled waveguides, and the setting of specific parameters during operation.

The length of the column was determined by the attenuation length of the microwave energy used in the system (approximately 915 MHz). It is contemplated that other microwave frequencies can be used as well. This attenuation length allows the molecules to be constantly bombarded by the radiation and continually "wash" the molecules. With the addition of another source of microwave energy in the column, the length of the column can be maintained and still get the benefit of having a longer column to continually bombard the molecules. The attenuation length is calculated to get the benefit of the propagation of the microwave energy up the column.

The usage of the water cooled waveguide allows the system to be tunable and implement the washing machine effect. This effect allows the operator to maintain the residency time of the molecules in the system and control the pressures that can be exerted on the reaction vessel and even the column itself. As the temperature of the water cooled waveguide is lowered, there is a higher pressure differential at the opening of the reaction vessel keeping positive pressure on the tank and its contents. The effect can be magnified by adding multiple water cooled waveguides to the waveguide assembly. The water cooled waveguides can also be located anywhere in the system to get the benefits of safety and tuning.

Additionally in some configurations, the other variables in the system may be changed to act on the vapors ascending the column and require them to either remain in the reactor or ascend at a higher rate, and have either less or more contact with the energy propagating within the column. When the temperature of the cooling is changed, this will affect the molecules' ability to ascend up the column and translate the bend at the top of the column and enter the condenser assembly. The cooler the column is made, the greater difficulty vapors will have ascending the column and navigating the bend of the column. Therefore, residency time will be increased. In the case of materials that have more similar boiling points and polarity, this allows for a greater degree of separation. When flow rate and vacuum are changed, this allows for the molecules in the fluid to have more or less contact with the microwave energy and affect the release rate of the molecules trapped within the fluid. The addition of another source of microwave radiation to the column would allow the molecules to receive more radiation and further separate them into purer and purer elements.

Embodiments of the window assembly disclosed include a front frame member, a back frame member, and a treated insert. An insert in the embodiment shown is used to protect the waveguides and microwave transmitter. The insert is composed of a heat treated PTFE. An embodiment of a process that is used to heat treat the PTFE is as follows:
1) Heat PTFE on slow ramp over one hour to 450° F.;
2) Increase ramp time 15 minutes maximum to 500° F. to manufacture sustained working temperature limit;
3) Increase heat to 600° F., ramp time 15 minutes maximum, hold temperature for five minutes, turn all heat off, let cool for 24-48 hours; and
4) After the product cools, sand surface using 200-400 grit, epoxy coated sanding media, wet sand and rinse product to gain higher polished surface to give better repelling abilities if required.

Reconditioning of the PTFE if damaged in one embodiment includes the following minimum steps:
1) Clean the surface of any foreign contaminants prior to heat treating process. If any contamination is not removed, it will become embedded into the surface of the PTFE.
2) The surface can be sanded or machined/reconditioning if damaged, i.e., from plasma discharges. Plasma discharges can pit polytetrafluoroethylene (PTFE), causing embedment of carbon particles.
3) When using ceramic materials, the chance of pitting and plating are drastically reduced, and the system can be used to high vacuum because of the rigidity of the material.
4) The window frame can also be made from PTFE, silicon carbide, ceramics and even be part of the waveguide flange assembly.

In embodiments of a disclosed system, there are several parameters that may be input to allow the system to operate. These parameters are microwave energy, waveguide and condenser cooling, flow rate, and vacuum.

The input of these parameters either by an operator or a PLC within the system allows the system to achieve separation of the constituents within the mixture. This effect is the washing machine effect. When the vapors are transitioning from the reaction vessel, up the column, and over the choke to the condenser at a higher rate than is desired, the parameters can be manipulated to slow this process down and keep the vapors trapped within the washing machine and further separate them into smaller fractions. If this process is seen to be too slow, then the parameters can be manipulated to speed up the flow of the vapors and allow the vapors less time in the washing machine part of the system.

In some embodiments, one way in which parameters can be manipulated to slow the vapor flow is by increasing the cooling temperature in the waveguide and increasing the cooling temperature in the condenser. By not allowing vapors to traverse the bend immediately after the column, additional exposure to microwave radiation may be applied before condensing.

The parameter list for the washing machine effect is included for reference:

| Parameter | Unit of Measure | Value |
| --- | --- | --- |
| Reactor Temperature | Degrees F. | 0-350 |
| Circulation Pump Temperature | Degrees F. | 0-350 |
| Fluid Flow | GPM | 0-400 |
| Microwave Energy | KW | 0-75 |
| Cooling Temperature - Waveguide | Degrees C. | 20-75 |
| Cooling Temperature - Condenser | Degrees C. | 20-75 |
| Vacuum | "Hg | 0-22 |
| Refractometer Sensor | % Water to Glycol | 0-100 |
| Level Sensor | Gallons | 0-100 |

The application or manipulation of the parameters within the washing machine in the system overcomes the previously used process of using packed or tray columns. The process of using tray columns allows for the vapors to condense on the trays at different levels within the column. The tuning of the washing machine effect and the specific length of the column obviates the need for more expensive and complicated arrangements such as tray columns.

While it may be economically and environmentally advantageous to use the systems, apparatuses, and methods described herein for large or industrial scale applications, such as the prevention, treatment, or processing of industrial wastes, it is contemplated that this device will also achieve similar results for small- or lab-scale applications.

FIG. 1 is a side view of one embodiment of the molecular targeting and separation apparatus. The apparatus comprises a microwave energy source 10, a programmable logic controller (PLC) 20, a waveguide 30, a reactor assembly 100, a column 110, a microwave choke 70, a condenser assembly 90, and a collection tank 80. During operation of the described apparatus, a constituent mixture 160 is inserted into the reactor assembly 100.

The microwave energy source 10 is designed to be capable of producing electromagnetic energy at frequencies generally within or near the range of 300 megahertz and 300 gigahertz. The PLC 20 is an optionally equipped electronic device which improves the ability for an operator, in addition to other parameters and variables, to adjust the power output of the microwave energy source 10, which can be varied as desired. The electromagnetic frequencies that the microwave energy source 10 produces cannot be adjusted for many microwave energy sources currently available commercially, as they are typically preset upon construction; however, it is contemplated that equipping the described apparatus with a variable frequency transmitter would be advantageous.

The waveguide 30 may be designed to conduct and direct microwave energy from the microwave energy source 10 to the reactor assembly 100 and also to restrict the flow of the constituent mixture 160 to the microwave energy source 10, thus enhancing separation for many cases and reducing safety risks that an operator may encounter while operating the apparatus. The waveguide assembly includes a waveguide section 30, a waveguide window 40, and a cooled waveguide section 50. The waveguide section 30 generally extends outward from a side wall of the microwave energy source 10 and is connected to the waveguide window 40. The waveguide window 40 may be secured at the apex between waveguide section 30 and cooled waveguide section 50, and anywhere along the length of the waveguide assembly.

The waveguide window 40 may be formed from a material exhibiting high strength and transparency to microwave energy at both lowered and elevated temperatures, although other types of materials may be suitable. The waveguide window 40 generally provides a pressure tight seal while allowing microwaves to be transmitted through. This prevents materials in the reactor from traveling to the microwave energy source 10. The waveguide section 30 and cooled waveguide section 40 typically are hollow and exhibit either a rectangular cross-sectional shape or an elliptical cross-sectional shape. A bottom surface of waveguide section 30 may comprise a plurality of slots to allow air flow there through. The waveguide section 30 and cooled waveguide section 50 are generally designed and configured to facilitate the protection of the waveguide window 40 and to direct microwave energy to the reactor assembly 100 in a manner that enhances operation of the described apparatus. It is often desirable that at least one of either waveguide section 30 or cooled waveguide section 50 have at least one bend or angle change between 0° and 180° to assist in directing microwave energy into the reactor assembly 100. The cooled waveguide section 50 generally incorporates water-cooling to cool vapors and liquids traversing towards the waveguide window 40 from the reactor assembly 100, thus increasing the long term duration of waveguide window 40 and the overall safety of operating the described apparatus.

The reactor assembly 100 is designed to store the constituent mixture 160 for processing and is in fluid communication with the column 110 at or near the top end portion of reactor assembly 100. The reactor assembly 100 may comprise a batch reactor, a continuously stirred tank reactor, a plug flow reactor, or a variety of other reactor types. The column 110 generally extends upward from reactor assembly 100, where it receives ascending vapors and microwave energy during operation. The top end portion of the column 110, which may exhibit bends or angle changes to redirect flow of vapors in a desired direction, is in fluid communication with the condenser assembly 90, which is designed to cool vapors traversing within the condenser assembly 90; in many cases, cooling of the vapors results in condensation of at least one of the constituents in the vapor. The height, diameter, and bends of the column 110 can be adjusted, as desired, by replacement of the column 110 while the described apparatus is not in operation.

In an embodiment and as shown in FIG. 1, the described apparatus may be equipped with a microwave choke 70 between and in fluid communication with the column 110 and condenser assembly 90. The microwave choke 70 generally takes the form of a reducer and exhibits a larger diameter end portion that connects with the top end portion of column 110 and a smaller diameter end portion that connects to the condenser assembly 90. While the inventor does not intend to be bound to any particular theory, it is believed that the microwave choke 70 forms a venturi, or a partial vortex, which further enhances separation of vapors traversing from the column 110 to the condenser assembly 90. Additionally, the microwave choke 70 limits or restricts microwave energy from entering the condenser assembly 90 or the collection tank 80. The microwave energy then is contained within the column 110 and the reactor assembly 100 to continuously act upon the molecules ascending from the reactor assembly 100 up the column 110 to the condenser assembly 90.

The condenser assembly 90 is in fluid communication with the collection tank 80, exhibits a cooling rate that can be varied as desired, receives cooled vapors or liquid, and is sized to meet the desired output for the separation process. The collection tank 80 may be equipped to be in fluid communication with an external storage tank and a fluid pump capable of transferring product to the external storage tank.

Although the cooled waveguide section 50 and the condenser assembly 90 may generally be any type of heat exchanger that removes heat from the constituents traversing within, it is often economically desirable that each of these components take the general form of a shell and tube type heat exchanger or condenser, wherein a cooling fluid passes through the space between the outer walls of the tube and the exterior shell to cool hot fluids traversing within the tube. While it is generally desirable that the condenser assembly 90 utilize an inexpensive and effective cooling fluid such as water, it is contemplated that other cooling fluids, such as air or a water and glycol mixture, are suitable.

In one embodiment, the waveguide assembly comprises a waveguide window 40 that is generally mounted in a custom-sized window frame. As modified, the waveguide window 40 has a reduced dielectric loss, does not fog, and allows for the system to hold a vacuum over a broader temperature range. For example, it was observed that the dielectric loss of the window had improved after treatment to be less than 0.1%. It was also observed that the thickness of the window can be varied to allow for the increase in vacuum and the separation of a more contaminated feedstock fluid stream.

Figure 2:
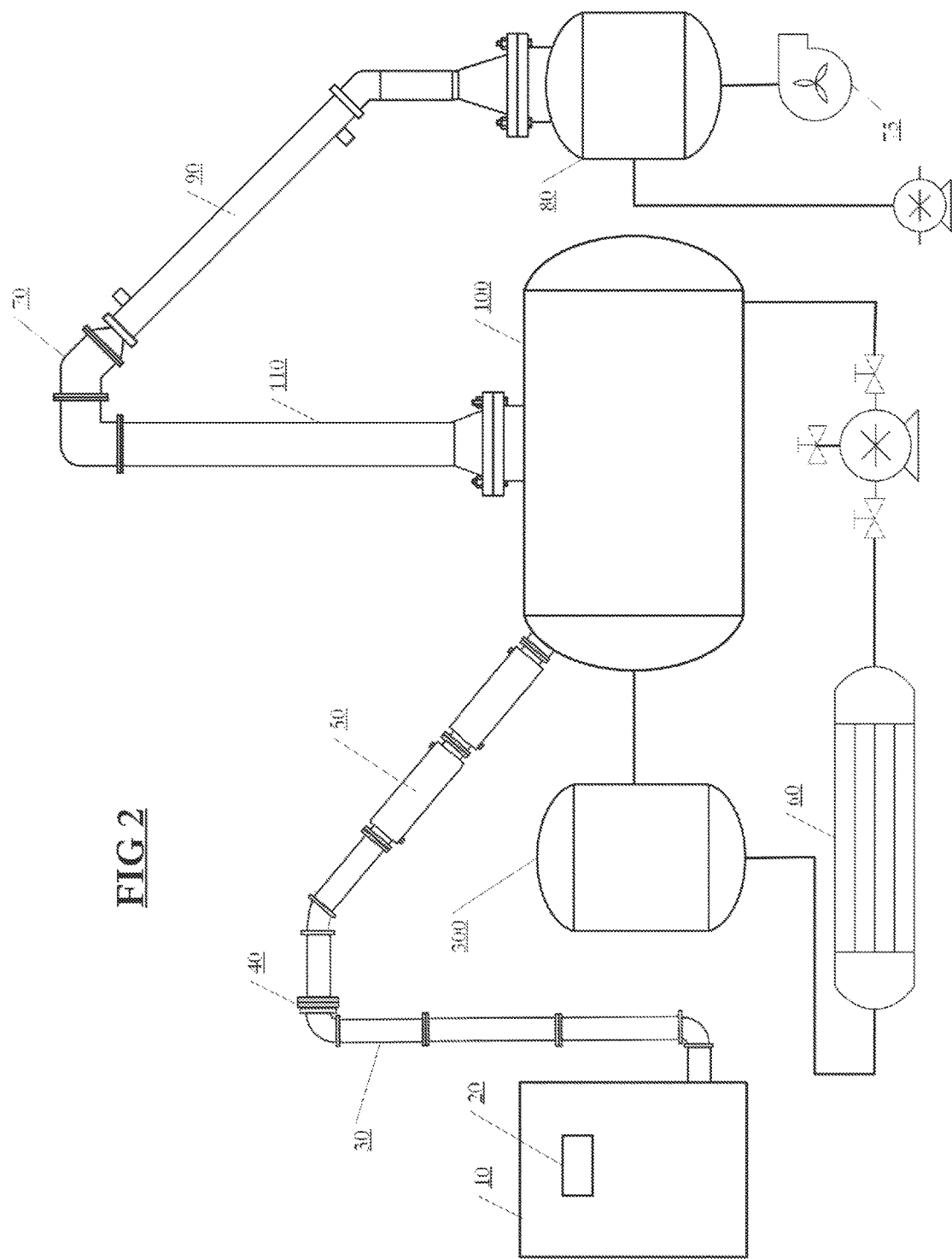
FIG. 2 is a side view of an embodiment of a molecular targeting and separation system further equipped with a heat exchanger, circulation pump, and a vacuum generator in accordance.

FIG. 2 is a side view of one embodiment of a molecular targeting and separation apparatus further equipped with a heat exchanger 60. The heat exchanger 60 is in thermal communication with the reactor assembly 100 and assists in the acceleration of the targeting and separation process for many mixtures by transferring thermal energy to or from the constituent mixture 160 contained within the reactor assembly 100. It is contemplated that many types of heat exchangers may be suitable for enhancing separation of many mixtures. Examples of heat exchangers include, but are not limited to, double pipe heat exchangers, shell and tube heat exchangers, plate heat exchangers, and plate and shell heat exchangers. Additionally, the heat exchanger may comprise a simple thermal bath into which the reactor assembly 100 is submerged. It is also contemplated that the heat exchanger can be constructed of silicon carbide with another source of microwave energy to excite the silicon carbide and provide heat to the mixture as it is circulated. In some alternatives the heat exchanger could be replaced with another source of heat energy, such as a catalytic heater. In other alternatives, the heat exchanger may be a variety of cooling apparatuses, or a combination of cooling and heating apparatuses that can be run individually, to heat or cool fluids in a variety of fashions. Additionally, cooling apparatuses may include a variety of baths or refrigeration devices, through which fluid may be transported for cooling.

FIG. 3 is a side view of the molecular targeting and separation apparatus further equipped with an alternate source of microwave energy connected to the column 110 at a point halfway up the column 110. This configuration allows for additional microwave agitation and separation. In some alternatives, the system may omit the primary microwave energy source that is connected to the reactor 100. In this configuration, constituent mixture 160 in reactor 100 may be heated in order to vaporize it. The vaporized mixture then may be treated with microwave energy only while in column 110. In another similar alternative, the reactor 100 may be eliminated and a vapor source may be fed into column 110 and treated with microwave energy from a source connected directly to column 110.

In an embodiment, the apparatus is further equipped with a grounding gasket 150 that is designed to provide an electrical ground between components of the apparatus. This reduces arcing that may occur, and thus reduces safety risks for cases when the constituent mixture 160 emits vapors that are flammable. The grounding gasket 150 is made from an electrically conductive material, such as copper, and generally is secured between the reactor assembly 100 and the column 110; however, it is contemplated that equipping the grounding gasket 150 at other locations of the apparatus would be suitable.

In one embodiment, a supplemental microwave absorbing material has been added to the constituent mixture 160, either by dissolution of the supplemental microwave absorbing material into or by suspension in the constituent mixture 160. The supplemental microwave absorbing material is in thermal communication with the constituent mixture 160, is designed to undergo dielectric heating upon being irradiated with microwave energy, and can be used in substitution for or in complementary unison with a heat exchanger 60 to provide thermal energy to the constituent mixture 160, which enhances separation for some cases, including cases where it has been discovered that elevating the temperature of the constituent mixture 160 results in the desired product being obtained. The material may take a number of forms or shapes which may include, but are not limited to, cylindrical rod, powder, disk, etc. Examples of supplemental microwave absorbing materials which are suitable for this embodiment include, but are not limited to, silicon carbide, inorganic salts, and many organic materials.

FIG. 4 is a cross-section view of one embodiment of the molecular targeting and separation system. In many cases, it is desirable that the apparatus be equipped with components from various embodiments described herein. By way of example, the cooling temperatures are applied to the condenser assembly 90 and the cooled waveguide 50, and the vapors within the molecular targeting and separation apparatus can be retained or allowed to transit the choke 70 into the condenser 90 to be cooled. It should be recognized that this embodiment further enhances control of thermal energy transfer to and from the constituent mixture 160, thus further reducing safety risks that may be encountered during operation. Although it is not a necessary component of the apparatus, a valve may be equipped to the reactor assembly 100, or other components of the apparatus as desired, to assist in insertion of the constituent mixture 160 or an external atmosphere of choice into the reactor assembly 100. Additionally, vacuum can be applied to the system by way of a vacuum pump 75 for further enhancing separation in many cases. It will be apparent to those skilled in the art in light of this disclosure that there are multiple configurations of apparatus components that would produce similar results. For example, a plurality of at least one of the various apparatus components is contemplated to enhance separation in many cases. The apparatus is capable of separating constituent mixtures wherein the molecular structure of at least one constituent in the constituent mixture 160 comprises a functional group that absorbs microwave energy. Additionally, as described in an embodiment, the inclusion of a supplemental microwave absorbing material to the constituent mixture 160 enhances separation of constituent mixtures, including constituent mixtures wherein none of the original constituents comprise a functional group that absorbs microwave energy. Examples of functional groups that absorb microwave energy include, but are not limited to, —OH, —NH2, —SH, etc. Thus, examples of constituents that may be separated using the described apparatus without the addition of a supplemental microwave absorbing material include, but are not limited to, water, glycols, glycerol, amines, etc.

Embodiments of the apparatus are designed to process and separate fluidic mixtures, which may be of known or unknown composition, and may be vapor phase, liquid phase, or a combination of liquid and vapor phases, and may additionally comprise solids, either dissolved or suspended.

FIG. 5A is a close up of one embodiment of the condenser assembly detailing the microwave choke 70. The larger end of the condenser 90 is connected to microwave choke 70 and allows for the vapors to be cooled after ascending the column 110 and traversing the choke 70. Separate cooling temperatures can be applied to condenser 90 to achieve different pressures within the system and contain or release vapors from the reactor assembly 100.

Figure 5B:
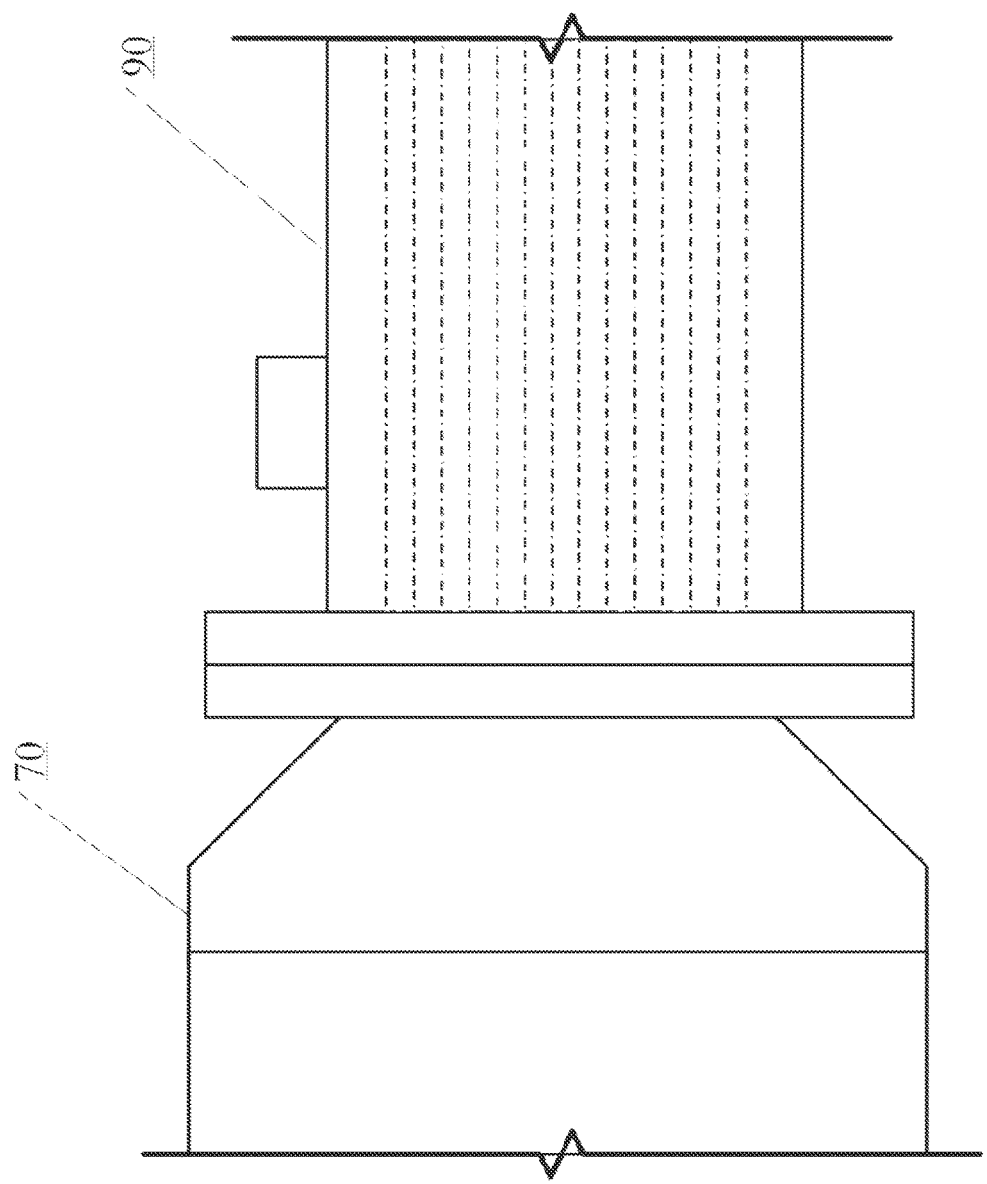
FIG. 5B is a close-up detail of an embodiment of a choke assembly at the input end of the condenser.

FIG. 5B details the connection between the choke 70 and the condenser 90.

FIG. 6A is the detail of one embodiment of the window assembly 40 used in the system. The window assembly consists of a frame front 140, a frame back 130, and a window insert 150. In one embodiment, the window assembly 40 is constructed of separate pieces. It also is contemplated that the window frame members can be part of the wave guide system components, either 30 or 50. The window insert 150 is heat treated to maintain the lowest dielectric and hardness properties.

Figure 6B:
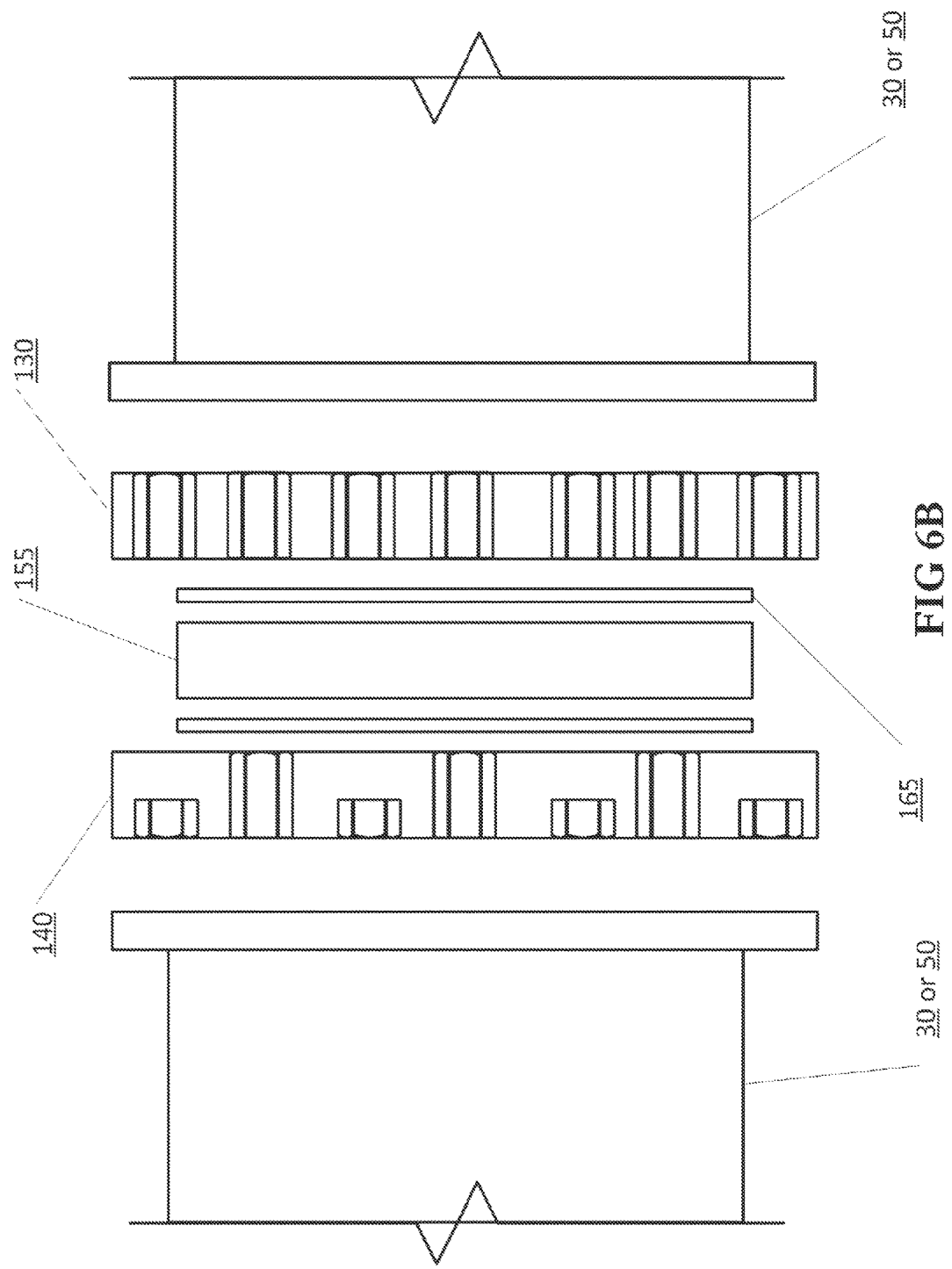
FIG. 6B is an exploded view of an embodiment of a window used within a molecular targeting and separation system.

FIG. 6B is an exploded view of the window assembly 40 and the usage of a gasket 165. There are many configurations that may need a gasket. For example, a configuration designed to hold high vacuum or to protect the microwave source 10 from contaminants or even explosions may need a gasket.

Figure 7A:
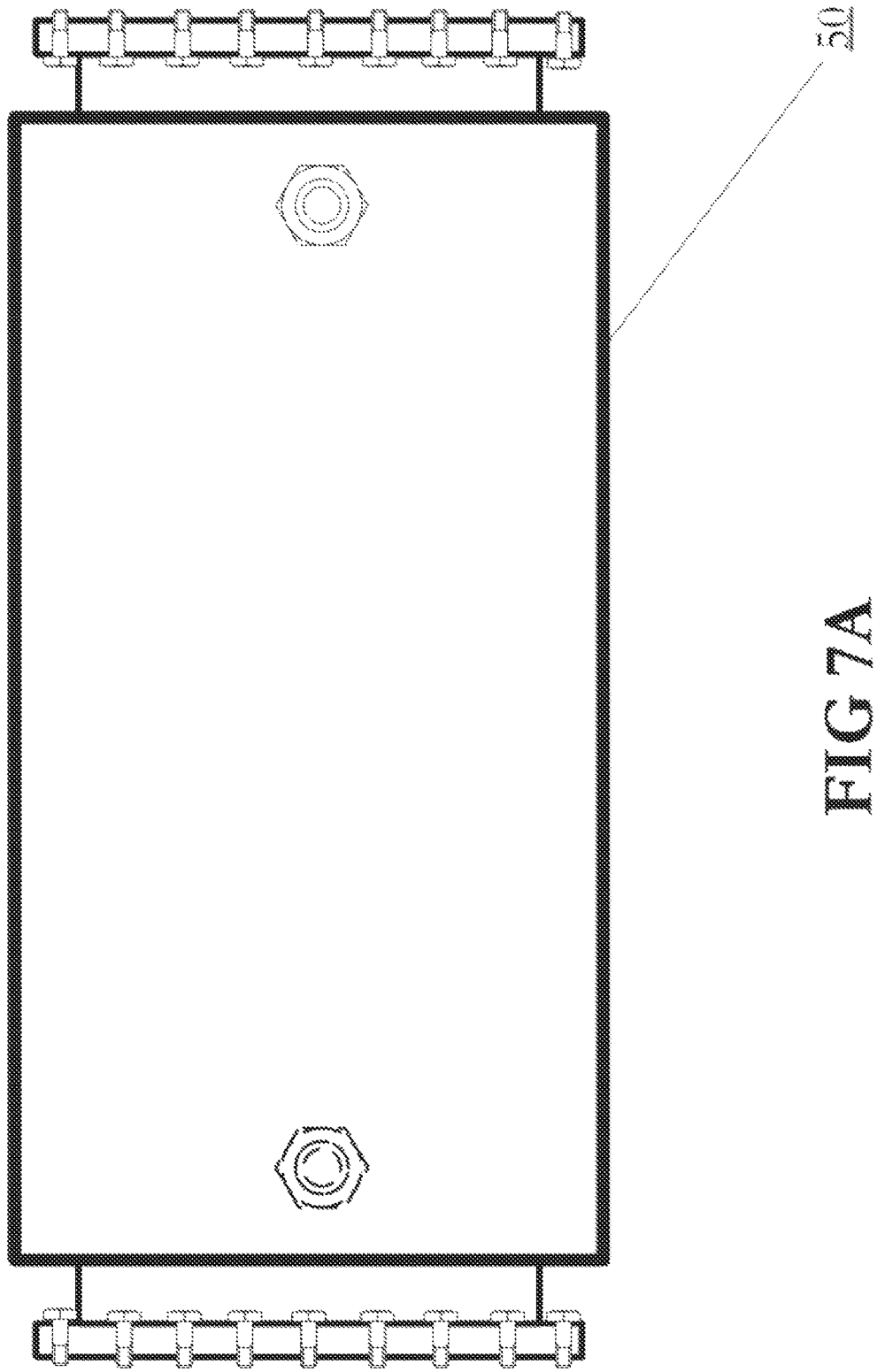
FIG. 7A is a top view of an embodiment of a water cooled waveguide used within a molecular targeting and separation system.
Figure 7B:
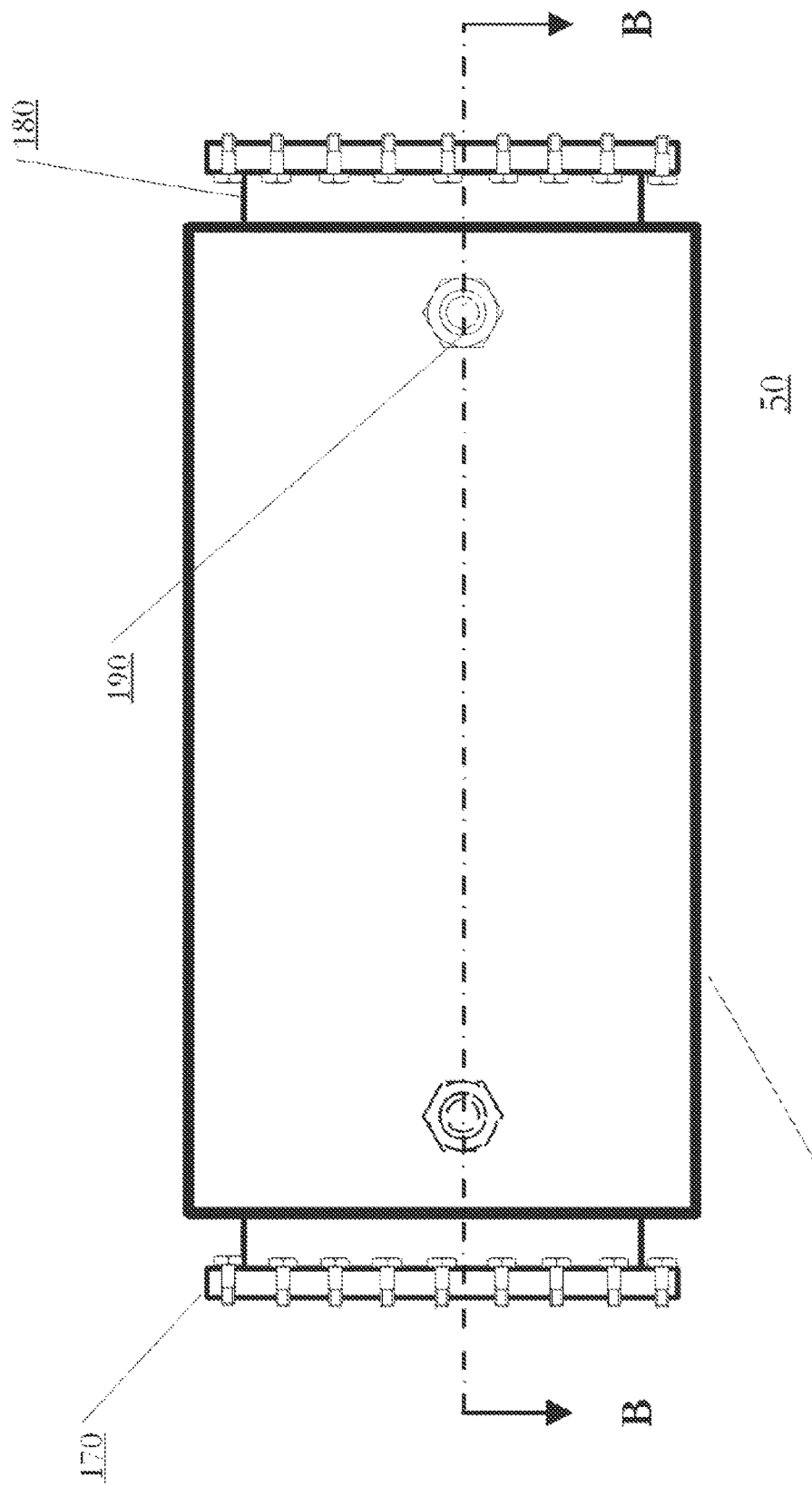
FIG. 7B is a detailed top view of an embodiment of a water cooled waveguide used within a molecular targeting and separation system.
Figure 7C:
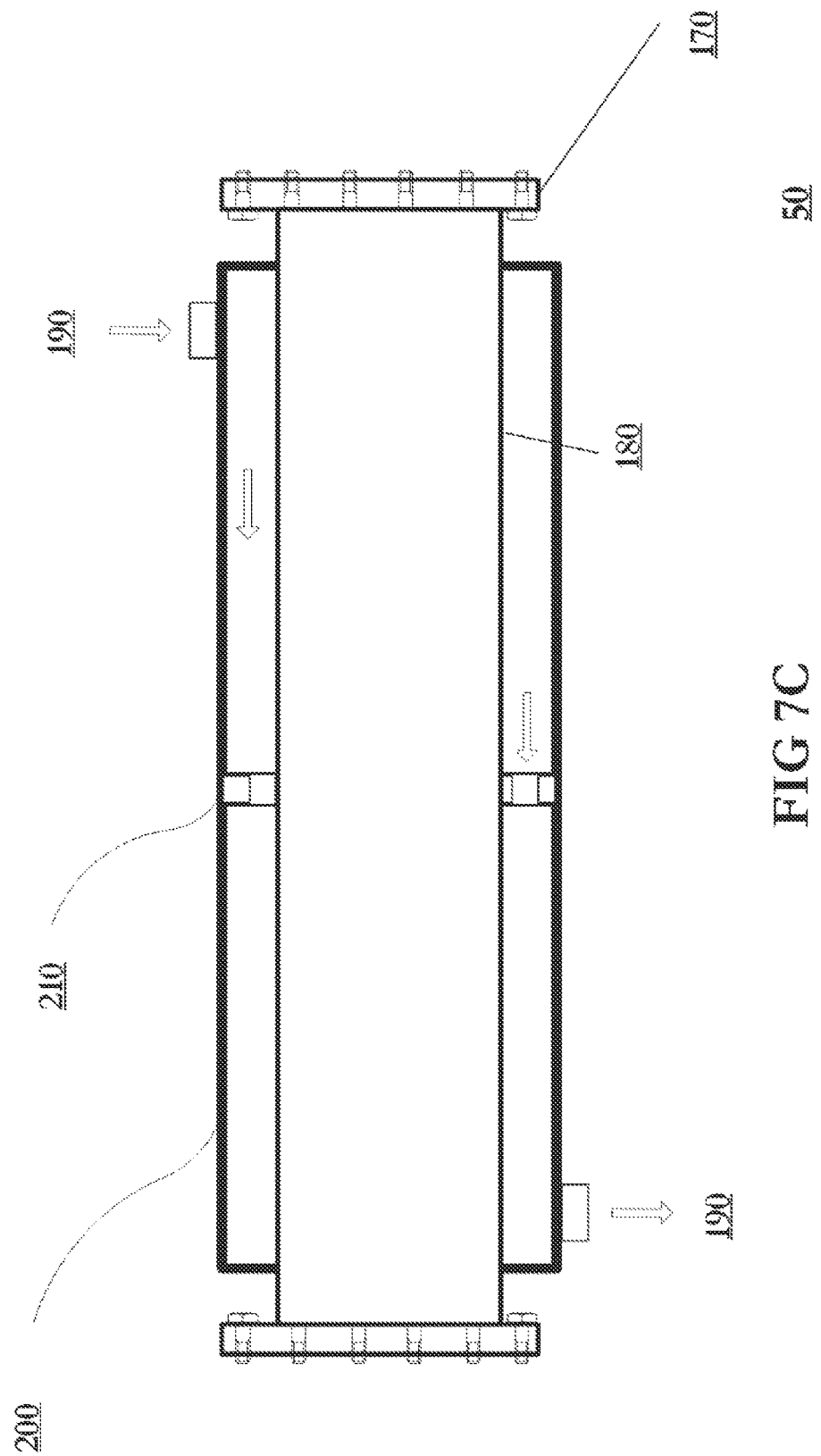
FIG. 7C is a detailed cross-section view of an embodiment of a water cooled waveguide used within a molecular targeting and separation system.

FIGS. 7A, 7B, and 7C present a view of one embodiment of the liquid cooled waveguide segment 50, including flanges 170, inner wall 180, outer wall 200, and cooling connections 190. During construction, support 210 is welded to inner wall 180 to facilitate a support structure so the outer wall 200 will not collapse during operation. After the inner wall 180 is welded to support 210, then the inner assembly is inserted into the outer wall 200 and centered. The outer wall 200 then is welded to the inner wall 180 and support 210 all around to create a contained chamber for the flow of liquid between the inner and outer walls. Flanges 170 then are welded in place to facilitate a connection point to other segments of the waveguide system. Finally, cooling connections 190 are installed in the outer wall 200 to facilitate fluid flow and cooling of the waveguide segment.

Figures 8A, 8B:
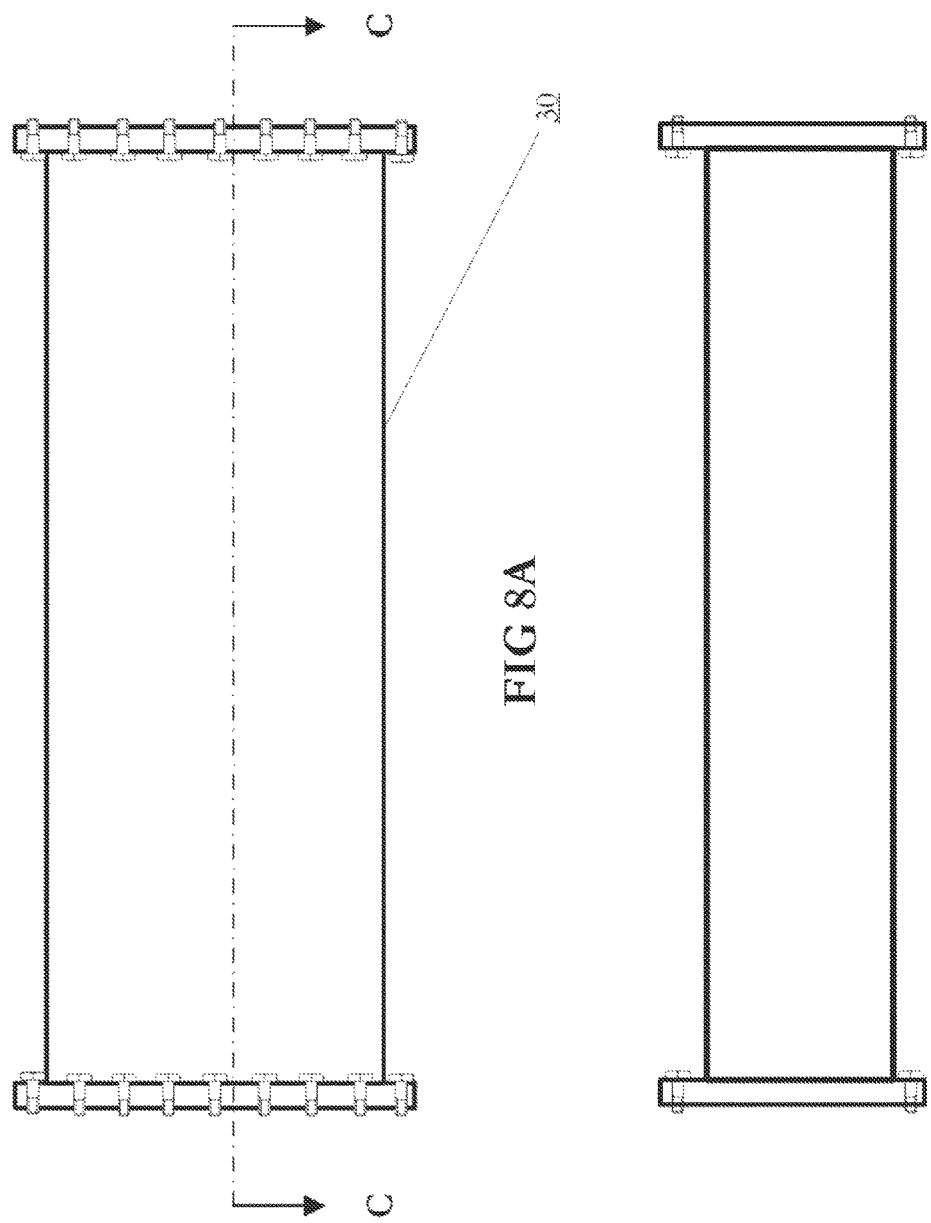
FIG. 8A is a top view of an embodiment of a waveguide used within a molecular targeting and separation system.
FIG. 8B is a cross-section view of an embodiment of a waveguide used within a molecular targeting and separation system.

FIGS. 8A and 8B show one embodiment of the construction of the standard waveguide segment 30. Waveguide segment 30 is used to translate and direct microwave energy to the reactor 100 to constituent mixture 160 for vaporization and separation.

An exemplary embodiment of a method of using molecular targeting and separation system is described below.

The operation of the described apparatus generally begins with the constituent mixture 160 being inserted into the reactor assembly 100, which may be performed manually by an operator, or by way of a valve in the alternative, which may be attached to the apparatus at a desired location. Power to the microwave energy source 10 is turned on and set to a desired level via PLC 20. It is submitted that a programmable logic controller or PLC 20 controlling the settings of the process be carefully monitored and regulated by the operator so that the reactions may progress properly and the desired product may be obtained. The PLC 20 may also be programmed with algorithms that allow the system to operate without operator input. The waveguide 30 safely directs microwave energy from the microwave energy source 10 to the window 40 and into the cooled waveguide section 50 and then into the reactor assembly 100, wherein the microwave energy is absorbed by at least one constituent of the constituent mixture 160 or by a supplemental microwave absorbing material, as described in an embodiment. This causes the composition of the constituent mixture 160 to change as vapors are emitted and ascend the column 110, passes through the microwave choke 70, cools, and, in many cases, condenses in the condenser assembly 90 and is collected in the collection tank 80. The disclosed method results in a product having a composition of constituents that differs, often significantly, from the composition of the constituent mixture 160 originally contained in the reactor assembly 100. The product in the collection tank 80 then can be stored within the collection tank or transferred to and stored within tanks external to the apparatus. A vacuum pump 75 facilitates the operation of the described apparatus at reduced pressures, which may be advantageous in many cases. During operation, an operator may adjust various parameters until the desired product is obtained. Parameters include power output of the microwave energy source 10, the extent of cooling taking place in the condenser assembly 90 and cooled waveguide 50, the extent of vacuum applied by the vacuum pump 75 when applicable, the extent of heat transfer applied by the heat exchanger 60, and the extent of circulation applied. The selection of these parameters allows for the operator or PLC 20 to make adjustments for the best clarity, purity, and rate of separation. The washing machine effect of the parametric changes allows for the molecules to be further stripped of contaminants and produce a purer product.

The disclosed method enables the disclosed apparatus to separate numerous constituent mixtures, including azeotropes. For constituent mixtures comprising constituents with various boiling points, the disclosed method can be used to enrich the higher boiling point liquid or the lower boiling point liquid in the product, as desired by the operator.

It is contemplated by the inventor that an accelerating constituent may be added to the constituent mixture in order to increase reaction rates for a constituent mixture undergoing reaction in the described apparatus.

It should be recognized that modifications of the apparatus and methods disclosed herein to make the technology suitable for treating and purifying solids and gases would fall within the scope of the disclosure. Implementation of such devices and methods will necessarily be determined through engineering and technically sound design decisions to meet the goal(s) to be achieved.

The disclosed systems provide for separating the constituents in fluid streams into individual constituents exhibiting high purity. The disclosed systems are capable of processing a broad spectrum of mixtures. In addition, the process is repeatable. It is recognized that various types of feedstock may require ventilation. In such cases, the disclosed device can be modified with an appropriate control device such as a scrubber.

The disclosed device can be sited as a permanent, semi-permanent, or mobile configuration. For example, it has been contemplated that such a unit may be placed on a flatbed trailer or railcar to accommodate processing at remote locations or in transient situations. Because it can be integrated into an existing system, the disclosed device is not limited to being a standalone device. For example, it can be as a post-treatment system in a biofuel plant, if desired. It should be recognized that modifications of the apparatus and methods disclosed herein make the technology suitable for treating and purifying numerous constituent mixtures once an initial baseline analysis has been established.

Although the disclosed systems, methods, and apparatuses have been described with reference to disclosed embodiments, numerous modifications and variations can be made and still the result will come within the scope of the disclosure. No limitation with respect to the specific embodiments disclosed herein is intended or should be inferred.

In addition to the embodiments described above, many examples of specific combinations are within the scope of the disclosure, some of which are detailed below.

Example 1

A system for molecular targeting and separating, the system comprising:
  a microwave energy source;
  a vapor source;
  a column configured and positioned to receive microwave energy from the microwave energy source and vapor from the vapor source; and a condenser, the condenser in communication with the column, the condenser configured to condense the vapor after the vapor receives the microwave energy.

Example 2

The system of Example 1, wherein the vapor source includes:
a reactor, the reactor including a constituent mixture, the reactor receiving the microwave energy from the microwave energy source, and produce vapor.

Example 3

The system of Example 2, further comprising:
a waveguide, the waveguide interconnected with the reactor and the microwave source, the waveguide positioned and configured to conduct the microwave energy to the reactor.

Example 4

The system of Example 3, wherein the waveguide includes a cooled waveguide section, the cooled waveguide section positioned between the microwave source and the reactor, wherein the cooled waveguide section is configured to prevent a backflow of vapor towards the microwave source and increase a residence time of the vapor.

Example 5

The system of Example 3, further comprising:
a bend portion located between the column and the condenser, the bend portion configured, in combination with a temperature control of the condenser, to slow the vapor from reaching the condenser and increasing the residence time of the vapor.

Example 6

An apparatus for molecular targeting and separating of mixtures, said apparatus comprising:
a microwave energy source capable of transmitting microwave energy;
a reactor assembly, wherein a constituent mixture comprising separable constituents is stored in the reactor assembly and undergoes irradiation by the microwave energy source and separation to emit vapors;
a waveguide wherein microwave energy is conducted and directed from said microwave energy source to said reactor assembly;
a column in fluid communication with said reactor assembly wherein said column is configured and attached to the reactor assembly to allow microwave energy to propagate and said vapors to be conducted there through;
a condenser assembly configured to provide for variably cooling said vapors; and
a collection tank in communication with the condenser assembly and configured to cool said vapors and collect said vapors.

Example 7

The apparatus of Example 6, wherein said waveguide comprises a waveguide section; a cooled waveguide section; and a waveguide window.

Example 8

The apparatus of Example 6, wherein said reactor assembly further comprises a supplemental microwave absorbing material coated around the reactor assembly.

Example 9

The apparatus of Example 6, further comprising a supplemental microwave absorbing material in said constituent mixture.

Example 10

The apparatus of Example 6, wherein said waveguide further comprises a rectangular cross-section form.

Example 11

The apparatus of Example 6, wherein said waveguide further comprises an elliptical cross section form.

Example 12

The apparatus of Example 6, wherein said apparatus further comprises a microwave choke.

Example 13

The apparatus of Example 6, wherein the microwave energy transmitted by the microwave energy source is within an approximate frequency range of at or between 300 megahertz and 300 gigahertz.

Example 14

The apparatus of Example 6, wherein said condenser assembly comprises a double tube heat exchanger.

Example 15

The apparatus of Example 6, wherein said condenser assembly comprises a shell and tube heat exchanger.

Example 16

The apparatus of Example 6, wherein said condenser assembly utilizes water as a cooling fluid.

Example 17

The apparatus of Example 6, wherein said condenser assembly utilizes a mixture of water and glycol as a cooling fluid.

Example 18

The apparatus of Example 6, wherein said collection tank is equipped externally to and in fluid communication with an external storage tank and a fluid pump capable of transferring product to said storage tank.

Example 19

The apparatus of Example 6, further comprising a programmable logic controller, the programmable logic controller configured to control the microwave energy source, a first temperature of the waveguide, and a second temperature of the condenser.

Example 20

The apparatus of Example 6, wherein said reactor assembly comprises a batch reactor.

Example 21

The apparatus of Example 6, wherein said reactor assembly comprises a continuously stirred tank reactor.

Example 22

The apparatus of Example 6, wherein said reactor assembly further comprises a heat exchanger.

Example 23

The apparatus of Example 22, wherein said heat exchanger comprises a double tube heat exchanger.

Example 24

The apparatus of Example 22, wherein said heat exchanger comprises a hollow coil submerged in a thermal bath wherein a fluid is circulated through the coil.

Example 25

The apparatus of Example 22, wherein said heat exchanger comprises a tank comprising a cooling fluid in which said reactor assembly is submerged.

Example 26

The apparatus of Example 22, wherein said heat exchanger comprises one or more shell and tube heat exchangers.

Example 27

The apparatus of Example 6, further comprising a fluid circulating assembly, the fluid circulating assembly in fluidic communication with the reactor assembly.

Example 28

The apparatus of Example 27, wherein said reactor assembly comprises a valve for assisting the insertion of said constituent mixture or an external atmosphere into said reactor assembly.

Example 29

The apparatus of Example 6, further comprising a grounding gasket in electrical communication with an electrical ground.

Example 30

The apparatus of Example 29 wherein said grounding gasket is constructed from a copper alloy.

Example 31

The apparatus of Example 7, wherein said waveguide window is constructed from a material substantially transparent to microwave energy.

Example 32

The apparatus of Example 7, wherein said waveguide window is constructed from a material comprising polytetrafluoroethylene.

Example 33

The apparatus of Example 7, wherein said waveguide window is constructed from a material comprising a ceramic material.

Example 34

The apparatus of Example 7, wherein said cooled waveguide section further comprises a shell and tube type heat exchanger.

Example 35

The apparatus of Example 7, wherein said cooled waveguide section further comprises water as a cooling fluid.

Example 36

The apparatus of Example 7, wherein said cooled waveguide section further comprises a mixture of a glycol and water as a cooling fluid.

Example 37

A method for separating mixtures using a molecular targeting and separation apparatus, said method comprising:
  inserting a constituent mixture comprising separable constituents into a reactor assembly;
  directing microwave energy via a waveguide from a microwave energy source wherein said reactor assembly and said microwave energy causes said constituent mixture to emit vapors that ascend a column;
  containing or releasing said vapors within said column by adjusting system parameters;
  selectively cooling said vapors within a condenser assembly to produce a product; and
  collecting said product in a collection tank.

Example 38

The method of Example 37, further comprising transferring said product from said collection tank to an external tank.

Example 39

The method of Example 37, further comprising applying vacuum to said reactor assembly.

Example 40

The method of Example 39, further comprising adding an accelerating constituent to the constituent mixture.

Example 41

The method of Example 40, wherein said accelerating constituent comprises silicon carbide.

Example 42

The method of Example 37, further comprising adjusting microwave energy output power toward the mixture via a programmable logic controller.

Example 43

The method of Example 37, further comprising selectively transferring thermal energy to or from said constituent mixture via a heat exchanger.

Example 44

The method of Example 37, further comprising circulating said constituent mixture to and from said reactor assembly via a fluid circulation assembly.

Example 45

The method of Example 37, further comprising adjusting circulation provided by a pump system.

Example 46

The method of Example 37, wherein said constituent mixture comprises a lower boiling point liquid and a higher boiling point liquid.

Example 47

The method of Example 37, wherein said constituent mixture comprises an azeotropic mixture.

Example 48

The method of Example 37, wherein the selectively cooling includes slowing the exit of the vapors from the column by adjusting a temperature of the condenser so the vapors more slowly traverse a bend between the column and the condenser.

Example 49

A system for molecular targeting and separation of mixtures, said system comprising:
  a microwave energy source capable of transmitting microwave energy to a reactor assembly, said reactor assembly configured to receive a constituent mixture comprising separable constituents;
  a waveguide capable of directing said microwave energy to said reactor assembly;
  a column in fluid communication with said reactor assembly;
  a condenser assembly in fluid communication with said column; and
  a collection tank.

Example 50

The system of Example 49, wherein said waveguide comprises a waveguide section, a cooled waveguide section, a waveguide window, and one or more flanges to secure said waveguide window between said waveguide section and said cooled waveguide section.

Example 51

The system of Example 49, further comprising a microwave choke, the microwave choke located at the end of the column.

Example 52

The system of Example 49, further comprising a vacuum pump, the vacuum pump in communication with the reactor assembly, the vacuum pump configured to apply a vacuum force to the reactor assembly.

Example 53

The system of Example 49, further comprising a grounding gasket, the grounding gasket providing an electrical ground.

Example 54

The system of Example 49, further comprising a programmable logic controller, the programmable logic controller configured to control the microwave energy source, a first temperature of the waveguide, and a second temperature of the condenser.

Example 55

The system of Example 49, further comprising a heat exchanger, the heat exchanger interconnected with the reactor assembly and configured to heat and cool the constituent mixture.

Example 56

The heat exchanger of Example 55, further comprising heating elements or a catalytic material in the constituent mixture.

Example 57

The system of Example 49, wherein multiple parameters, including a power output of the microwave energy source, a first temperature of the waveguide, and a second temperature of the condenser are adjusted to contain and release vapors from within said column and said reactor assembly.

I claim:
1. A system for molecular targeting and separating, the system comprising:
  a microwave energy source;
  a vapor source, wherein the vapor source includes:
    a reactor, the reactor including a constituent mixture, the reactor receiving the microwave energy from the microwave energy source, and producing vapor;
  a column configured and positioned to receive microwave energy from the microwave energy source and vapor from the vapor source;
  a condenser, the condenser in communication with the column, the condenser configured to condense the vapor after the vapor receives the microwave energy;
  a choke located between the column and the condenser, the choke taking the form of a reducer including a larger diameter end portion that connects with a top end portion of the column and a smaller diameter end portion that connects to the condenser, and configured to create a Venturi effect in the vapor travelling towards the condenser;

a waveguide, the waveguide interconnected with the reactor and the microwave source, the waveguide positioned and configured to conduct the microwave energy to the reactor; and a programmable logic controller configured to control multiple parameters, including a power output of the microwave energy source, a first temperature of the waveguide, and a second temperature of the condenser, programmable logic controller further configured to adjust the multiple parameters in order to contain and release vapors from within said column and said reactor assembly.

2. The system of claim 1, wherein the waveguide includes a cooled waveguide section, the cooled waveguide section positioned between the microwave source and the reactor, wherein the cooled waveguide section is configured to prevent a backflow of vapor towards the microwave source and increase a residence time of the vapor.

3. The system of claim 1, further comprising:

a bend portion located between the column and the condenser, the bend portion configured, in combination with a temperature control of the condenser, to slow the vapor from reaching the condenser and increasing the residence time of the vapor.

\* \* \* \* \*